US006844388B2

(12) United States Patent
Grootaert et al.

(10) Patent No.: US 6,844,388 B2
(45) Date of Patent: *Jan. 18, 2005

(54) FLUOROPOLYMER COMPOSITIONS CONTAINING A NITROGEN CURE SITE MONOMER

(75) Inventors: Werner M. A. Grootaert, Oakdale, MN (US); Robert E. Kolb, Afton, MN (US); Klaus Hintzer, Lindenstrasse (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/122,489

(22) Filed: Apr. 11, 2002

(65) Prior Publication Data

US 2002/0177666 A1 Nov. 28, 2002

Related U.S. Application Data

(60) Provisional application No. 60/283,535, filed on Apr. 12, 2001.

(51) Int. Cl.[7] .................................................. C08F 8/00
(52) U.S. Cl. ..................... 524/424; 525/326.3; 525/340
(58) Field of Search .............................. 525/326.3, 340; 524/424

(56) References Cited

U.S. PATENT DOCUMENTS

| | | |
|---|---|---|
| 3,523,132 A | 8/1970 | Dorfman et al. |
| 3,546,186 A | 12/1970 | Gladding et al. |
| 3,686,143 A | 8/1972 | Bowman |
| 3,752,787 A | 8/1973 | de Brunner |
| 4,035,565 A | 7/1977 | Apotheker et al. |
| 4,259,463 A | 3/1981 | Moggi et al. |
| 4,281,092 A | 7/1981 | Breazeale |
| 4,335,238 A | 6/1982 | Moore et al. |
| 4,487,903 A | 12/1984 | Tatemoto |
| 4,564,662 A | 1/1986 | Albin |
| 4,694,045 A | 9/1987 | Moore |
| 4,734,465 A | 3/1988 | Moggi et al. |
| 4,762,891 A | 8/1988 | Albin et al. |
| 4,882,390 A | 11/1989 | Kolb |
| 4,912,171 A * | 3/1990 | Grootaert et al. ........... 525/340 |
| 4,948,853 A | 8/1990 | Logothetis |
| 4,972,038 A | 11/1990 | Logothetis |
| 4,983,680 A | 1/1991 | Ojakaar |
| 5,032,655 A | 7/1991 | Moore |
| 5,262,490 A | 11/1993 | Kolb et al. |
| 5,266,650 A | 11/1993 | Guerra et al. |
| 5,268,405 A | 12/1993 | Ojakaar et al. |
| 5,285,002 A | 2/1994 | Grootaert |
| 5,319,025 A | 6/1994 | Weigelt |
| 5,349,093 A | 9/1994 | Oka et al. |
| 5,451,625 A | 9/1995 | Fukushi |
| 5,527,861 A | 6/1996 | Logothetis |
| 5,554,680 A | 9/1996 | Ojakaar |
| 5,565,512 A | 10/1996 | Saito et al. |
| 5,585,449 A | 12/1996 | Arcella et al. |
| 5,591,804 A | 1/1997 | Coggio et al. |
| 5,621,145 A | 4/1997 | Saito et al. |
| 5,639,837 A | 6/1997 | Farnham et al. |
| 5,654,375 A | 8/1997 | Jing et al. |
| 5,677,389 A | 10/1997 | Logothetis et al. |
| 5,681,881 A | 10/1997 | Jing et al. |
| 5,700,879 A | 12/1997 | Yamamoto et al. |
| 5,728,773 A | 3/1998 | Jing et al. |
| 5,756,588 A | 5/1998 | Kolb et al. |
| 5,767,204 A | 6/1998 | Iwa et al. |
| 5,789,489 A | 8/1998 | Coughlin et al. |
| 5,789,509 A | 8/1998 | Schmiegel |

(List continued on next page.)

FOREIGN PATENT DOCUMENTS

| | | |
|---|---|---|
| EP | 0 140 207 A2 | 5/1985 |
| EP | 0 708 139 A1 | 4/1996 |
| EP | 0 769 521 A1 | 4/1997 |
| EP | 0 661 304 B1 | 10/1997 |
| EP | 0 784 064 B1 | 11/1999 |
| WO | WO 90/14368 | 11/1990 |
| WO | WO 99/48939 | 9/1999 |
| WO | WO 00/09569 | 2/2000 |
| WO | WO 00/09603 | 2/2000 |
| WO | WO 01/02448 A1 | 1/2001 |
| WO | WO 01/59005 A2 | 8/2001 |

OTHER PUBLICATIONS

Brown et al., "Reactions of Perfluoroalkyl Nitriles. V. Synthesis of Perfluoroacyl Imidates", *J. Org. Chem.*, vol. 30, (1965), pp. 3724–3728.
Yakubovich et al., "Syntheses in the 1,3,5–Triazine Series V. Iminoesters of Perfluorocarboxylic Acids–Synthese, Properties, and Mechanism of Cyclopolymerization to 1,3,5–Triazine Derivatives", pp. 878–885, (translated from *Zhurnal Obshchei Khimii*, vol. 36, No. 5, pp 863–871, May 1966).
Grinblat et al., "Infrared Investigation of The Vulcanization of Perfluoroalkylenetriazine Polymers", *Polymer Science U.S.S.R.*, vol. 21, 1980, pp. 1434–1441.
Paciorek et al., "Reactions of Perfluoronitriles. I. Interactions with Aniline", *Journal of Fluorine Chemistry*, 30 (1985), pp. 241–250.

Primary Examiner—Bernard Lipman
(74) Attorney, Agent, or Firm—Dean M. Harts

(57) ABSTRACT

A composition of (a) a fluoropolymer having interpolymerized units derived from a nitrogen-containing cure site monomer; and (b) a nonfluorinated catalyst composition that includes a compound having the general formula: $\{RA\}^{(-)}\{QR'_k\}^{(+)}$ or in certain cases the precursors thereof, wherein R is hydrogen, an alkyl, alkenyl, cycloalkyl, cycloalkenyl, aryl or aralkyl, A is an acid- or acid-derivative anion, Q is phosphorous, sulfur, nitrogen, arsenic, or antimony, and each R' is hydrogen or an alkyl, aryl, aralkyl, or alkenyl group, k is the valence of Q; and optionally (c) an alcohol of the formula $R^2$—OH, wherein $R^2$ is an alkyl group which can be partially fluorinated. Also provided are a method of making a fluoropolymer, a method of increasing induction time, and fluoropolymer articles containing curable or cured fluoropolymer compositions.

35 Claims, No Drawings

U.S. PATENT DOCUMENTS

| | | | |
|---|---|---|---|
| 5,824,749 A | * 10/1998 | Sonoi et al. | 525/351 |
| 5,877,264 A | 3/1999 | Logothetis et al. | |
| 5,910,552 A | 6/1999 | Saito et al. | |
| 6,077,609 A | 6/2000 | Blong et al. | |
| 6,114,452 A | 9/2000 | Schmiegel | |
| 6,211,319 B1 | 4/2001 | Schmiegel | |
| 6,281,296 B1 | 8/2001 | MacLachlan et al. | |
| 6,465,576 B1 | * 10/2002 | Grootaert et al. | 525/199 |
| 6,593,416 B2 | * 7/2003 | Grootaert et al. | 524/545 |

\* cited by examiner

FLUOROPOLYMER COMPOSITIONS CONTAINING A NITROGEN CURE SITE MONOMER

CROSS REFERENCE TO RELATED APPLICATIONS

This application claims priority to pending prior application U.S. Ser. No. 60/283,535 filed on 12, Apr. 2001, the disclosure of which is herein incorporated by reference.

TECHNICAL FIELD

This invention relates to curing fluoropolymer compositions having nitrogen-containing cure-site components and catalyst compositions for curing such fluoropolymers.

BACKGROUND

Fluorine-containing polymers (also known as "fluoropolymers") are a commercially useful class of materials. Fluoropolymers include, for example, crosslinked fluoroelastomers, uncrosslinked fluoroelastomer gums, and semi-crystalline fluoroplastics. Fluoroelastomers exhibit significant tolerance to high temperatures and harsh chemical environments. Consequently, they are particularly well adapted for use as seals, gaskets, and other molded parts in systems that are exposed to elevated temperatures and/or corrosive chemicals. Such parts are widely used in the automotive, chemical processing, semiconductor, aerospace, and petroleum industries, among others.

Fluoroelastomers often include a cure-site component to facilitate cure in the presence of a catalyst. One class of useful cure-site components includes nitrile group-containing monomers, for which organotin catalysts have been used as curing components. Such catalysts can leave undesirable extractable metal residues in the cured product and are undesirable for environmental reasons. Ammonia-generating compounds have also been used as a cure system component. These cure systems lack the desired level of rheology control during processing.

SUMMARY

In one aspect, the invention relates to a composition that includes (a) a fluoropolymer having interpolymerized units derived from a nitrogen-containing cure site monomer; (b) a nonfluorinated catalyst composition that includes a compound having the general formula:

$$\{RA\}^{(-)}\{QR'_k\}^{(+)} \qquad (1)$$

or in certain cases the precursors thereof added separately or as a mixture; and optionally (c) an alcohol of the general formula $R^2$—OH, wherein $R^2$ is an alkyl group having from 1 to 20 carbon atoms, and wherein $R^2$ can be partially fluorinated.

In Formula 1:

R is hydrogen or an alkyl or alkenyl having from 1 to 20 carbon atoms, cycloalkyl or cycloalkenyl having from 3 to 20 carbon atoms, or aryl or alkaryl having from 6 to 20 carbon atoms. R can contain at least one heteroatom, i.e., a non-carbon atom such as O, P, S, or N. R can also be substituted, such as where one or more hydrogen atoms in the group is replaced with Cl, Br, or I.

A is an acid anion or an acid derivative anion, e.g., A can be COO, $SO_3$, $SO_2$, $SO_2NH$, $PO_3$, $CH_2OPO_3$, $(CH_2O)_2PO_2$, $C_6H_4O$, $OSO_3$, O (in the cases where R is hydrogen, aryl, or alkylaryl),

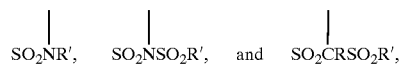

preferably COO, O, $C_6H_4O$, $SO_3$, $OSO_3$, or

most preferably COO, O, $SO_3$, and $OSO_3$; R' is defined as R (above), and a particular selection for R' may be the same or different from the R attached to A, and one or more A groups may be attached to R;

Q is phosphorous (P), sulfur (S), nitrogen (N), arsenic (As), or antimony (Sb), and k is the valence of Q.

Each R' is, independently, hydrogen or a substituted or unsubstituted alkyl, aryl, aralkyl, or alkenyl group having from 1 to 20 carbon atoms, provided that when Q is nitrogen and the fluoropolymer in the composition consists essentially of a terpolymer of TFE, a perfluorovinylether, and a perfluorovinylether cure site monomer comprising a nitrile group not every R' is H. That is, when the specified terpolymer is the only fluoropolymer in a composition, the group $QR'_k$ is not $NH_4$, however, $NR'_4$, $NHR'_3$, and $NH_3R'_2$ all fall within the scope of certain embodiments of the present invention. For example, when the cure site monomer is a nitrogen-containing partially-fluorinated vinyl ether, the group $QR'_k$ can be $NH_4$.

Examples of suitable substituents include halogens except fluorine (e.g., chlorine, bromine, iodine), cyano, $OR^3$, and $COOR^3$ groups wherein $R^3$ is selected from hydrogen or the alkali or alkaline earth metals, of which H, K, Na, and $NH_4$, are preferred, $C_1$ to $C_{20}$ alkyl, aryl, aralkyl, alkenyl, and R (as described above) groups. In addition, any pair of said R' groups may be connected to each other and the Q atom to form a heterocyclic ring.

In other aspects, the invention provides a method of making a fluoropolymer composition involving providing a composition as described above, mixing, shaping, curing (i.e., press-curing and optionally post-curing), and optionally heat aging the composition. The invention also provides a method of improving scorch resistance (also called scorch safety) in a curable fluoropolymer comprising the steps of providing a fluoropolymer comprising interpolymerized units derived from a nitrogen-containing cure site monomer and incorporating, into the fluoropolymer, a nonfluorinated catalyst composition that includes a compound having the general formula: $\{RA\}^{(-)}\{QR'_k\}^{(+)}$ or the precursors thereof added separately or as a mixture, wherein R, A, Q, R', and k are as defined above in reference to Formula (1). The invention also provides articles containing the curable or cured compositions such as hoses, gaskets, and O-rings.

The compositions retain the advantages of the use of nitrogen-containing cure site monomers (e.g., nitrile group containing cure site monomers) such as the high temperature performance properties typically achieved when organotin compounds or ammonia-generating compounds are used as the catalyst system with such cure site monomers. At the same time, the compositions exhibit improved properties, such as compression set values, as compared to materials made using the organotin compounds.

In addition, the inventive compositions have a controllable cure onset time (also termed induction time), and cure temperature such that various processing operations such as molding or extrusion are possible without the usual concern for premature curing (scorch). Thus, the invention provides better scorch resistance than is available with known ammonia-generating cure systems, e.g., those described in WO 00/09569 and WO 00/09603. These advantages are achieved while the post-cured compositions of the present invention exhibit physical properties at least as good as comparable fluoropolymer compounds made without the inventive compositions.

The inventive compositions are useful in applications where high temperature exposure and/or harsh chemical exposure are expected.

The details of one or more embodiments of the invention are set forth in the description below. Other features, objects, and advantages of the invention will be apparent from the description and from the claims.

DETAILED DESCRIPTION

The composition of the present invention comprises a fluoropolymer, a catalyst composition of Formula (1), and optionally, an alcohol.

Suitable fluoropolymers include interpolymerized units derived from a nitrogen-containing monomer and, preferably, at least two principal monomers. Examples of suitable candidates for the principal monomer include perfluoroolefins (e.g., tetrafluoroethylene (TFE) and hexafluoropropylene (HFP)), chlorotrifluoroethylene (CTFE), perfluorovinyl ethers (e.g., perfluoroalkyl vinyl ethers and perfluoroalkoxy vinyl ethers), and optionally, hydrogen-containing monomers such as olefins (e.g., ethylene, propylene, and the like), and vinylidene fluoride (VDF). Such fluoropolymers include, for example, fluoroelastomer gums and semi-crystalline fluoroplastics.

When the fluoropolymer is perhalogenated, preferably perfluorinated, it contains at least 50 mole percent (mol %) of its interpolymerized units derived from TFE and/or CTFE, optionally including HFP. The balance of the interpolymerized units of the fluoropolymer (10 to 50 mol %) is made up of one or more perfluoro vinyl ethers and a suitable nitrogen-containing cure site monomer (e.g., a nitrile-containing vinylether or an imidate containing vinylether). The cure site monomer makes up from about 0.1 to about 5 mol % (more preferably from about 0.3 to about 2 mol %) of the elastomer.

When the fluoropolymer is not perfluorinated, it contains from about 5 to about 90 mol % of its interpolymerized units derived from TFE, CTFE, and/or HFP, from about 5 to about 90 mol % of its interpolymerized units derived from VDF, ethylene, and/or propylene, up to about 40 mol % of its interpolymerized units derived from a vinyl ether, and from about 0.1 to about 5 mol % (more preferably from about 0.3 to about 2 mol %) of a suitable nitrogen-containing cure site monomer.

Suitable perfluorinated vinyl ethers include those of the formula:

$$CF_2=CFO(R^2_fO)_a(R^3_fO)_bR^4_f \quad (2)$$

where $R^2_f$ and $R^3_f$ are the same or are different linear or branched perfluoroalkyl groups of 1–6 carbon atoms; a and b are, independently, 0 or an integer from 1 to 10; and $R^4_f$ is a perfluoroalkyl group of 1–6 carbon atoms.

A preferred class of perfluoroalkyl vinyl ethers includes compositions of the formula:

$$CF_2=CFO(CF_2CFXO)_dR^4_f \quad (3)$$

wherein X is F or $CF_3$; d is 0–5; and $R^4_f$ is a perfluoroalkyl group of 1–6 carbon atoms.

Most preferred perfluoroalkyl vinyl ethers are those where, in reference to either Formula (2) or (3) above, d is 0 or 1 and each $R^2_f$, $R^3_f$, and $R^4_f$ contains 1–3 carbon atoms. Examples of such perfluorinated ethers include perfluoromethyl vinyl ether, perfluoroethyl vinyl ether, and perfluoropropyl vinyl ether.

Other useful perfluorinated monomers include those compounds of the formula:

$$CF_2=CFO[(CF_2)_e(CFZ)_g O]_h R^4_f \quad (4)$$

where $R^4_f$ is a perfluoroalkyl group having 1–6 carbon atoms, e is 1–5, g is 0–5, and Z is F or $CF_3$. Preferred members of this class are those in which $R^4_f$ is $C_3F_7$, e is 1 or 2, g is 0 or 1, and h is 1.

Additional perfluoroalkyl vinyl ether monomers useful in the invention include those of the formula:

$$CF_2=CFO[(CF_2CF(CF_3)O)_k(CF_2)_pO(CF_2)_q]C_rF_{2r+1} \quad (5)$$

where k is 0–10, p is 1–6, q is 0–3, and r is 1–5. Preferred members of this class include compounds where k is 0 or 1, p is 1–5, q is 0 or 1, and r is 1.

Perfluoroalkoxy vinyl ethers useful in the invention include those of the formula:

$$CF_2=CFO(CF_2)_t[CF(CF_3)]_u O(CF_2O)_w C_xF_{2x+1} \quad (6)$$

wherein t is 1–3, u is 0–1, w is 0–3, and x is 1–5, preferably 1. Specific, representative, examples of useful perfluoroalkoxy vinyl ethers include $CF_2=CFOCF_2OCF_2CF_2CF_3$, $CF_2=CFOCF_2OCF_3$, $CF_2=CFO(CF_2)_3OCF_3$, and $CF_2=CFOCF_2CF_2OCF_3$. Mixtures of perfluoroalkyl vinyl ethers and perfluoroalkoxy vinyl ethers may also be employed.

Perfluoroolefins useful in the invention include those of the formula:

$$CF_2=CF-R^5_f \quad (7)$$

where $R^5_f$ is fluorine or a perfluoroalkyl of 1 to 8, preferably 1 to 3, carbon atoms.

In addition, partially-fluorinated monomers or hydrogen-containing monomers such as olefins (e.g., ethylene, propylene, and the like), and vinylidene fluoride can be used in the fluoropolymer of the invention, when the fluoropolymer is not perfluorinated.

One example of a useful fluoropolymer is composed of principal monomer units of tetrafluoroethylene and at least one perfluoroalkyl vinyl ether. In such copolymers, the copolymerized perfluorinated ether units constitute from about 10 to about 50 mol % (more preferably 15 to 35 mol %) of total monomer units present in the polymer.

One or more other fluoropolymers may be incorporated into the fluoropolymer having interpolymerized units derived from a nitrogen-containing cure site monomer. In addition, one or more other fluoropolymers (which may include one or more copolymers) may be blended with the fluoropolymer (which may comprise a copolymer) having interpolymerized units derived from a nitrogen-containing cure site monomer. Such other fluoropolymers useful in a blend and/or copolymer include the entire array described above, and including homopolymers and copolymers comprising the interpolymerized units mentioned above. For example, polytetrafluoroethylene (PTFE) and PFA (tetrafluoroethylene-perfluorovinylether) are useful. The other fluoropolymer(s) may lack interpolymerized units derived from a nitrogen-containing cure site monomer and/or may include reactive sites adapted to a selected curative system. For example, two different fluoropolymers, each having interpolymerized units derived from a nitrogen-containing cure site monomer, such as a monomer comprising a nitrile group may be blended to provide the fluoropolymer for the present invention.

Another fluoropolymer may be included along with another curative, such as described below, to provide particular properties. For example, a fluoropolymer suitable for peroxide curing and a peroxide curative may be included to improve chemical stability. Such a blend balances the thermal stability and the chemical stability of the resultant blend, and also may provide economic benefits. These other curatives also may be used to cure a blend of nitrogen-containing fluoropolymers without the need to include a fluoropolymer lacking a nitrogen-containing cure site monomer.

The fluoropolymer(s) having nitrogen-containing cure site monomers preferably make up enough of the total fluoropolymer to provide increased thermal stability over a comparative fluoropolymer that lacks the composition of the present invention. This amount is generally at least 25 weight percent (wt %), more preferably at least 50 wt %, of the total fluoropolymer in the invention. In some embodiments, the fluoropolymer is comprised entirely of nitrogen-containing interpolymerized units.

The fluoropolymers may be prepared by methods known in the art. For example, the polymerization process can be carried out by free-radical polymerization of the monomers as an aqueous emulsion polymerization or as a solution polymerization in an organic solvent. When fluoropolymer blends are desired, a preferable route of incorporation is through blending the fluoropolymer latices in the selected ratio, followed by coagulation and drying.

The nature and the amount of end groups are not critical to the success in curing the fluoroelastomers of the invention. For example, the polymer can contain $SO_3^{(-)}$ end groups generated by an APS/sulfite system, or the polymer may contain $COO^{(-)}$ end groups generated by an APS initiator system or the fluoroelastomer can have "neutral" end groups, e.g., those generated by the use of fluorosulfinate initiator systems or organic peroxides. Chain transfer agents of any kind can significantly reduce the number of end groups. If desired, such as for improved processing, the presence of strong polar end groups such as $SO_3^{(-)}$ can be minimized and in the case of $COO^{(-)}$ end groups, the amount can be reduced through post treatments (e.g., decarboxylation).

The cure site component allows one to cure the fluoropolymer. The cure site component can be partially or fully fluorinated. At least one cure site component of at least one fluoropolymer comprises a nitrogen-containing group. Examples of nitrogen-containing groups useful in the cure site monomers of the present invention include nitrile, imidate, amidine, amide, imide, and amine-oxide groups. Useful nitrile group-containing cure site monomers include nitrile-containing fluorinated olefins and nitrile-containing fluorinated vinyl ethers, such as depicted below:

    (8)

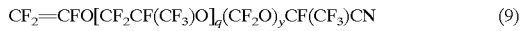    (9)

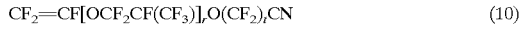    (10)

    (11)

where, in reference to the above formulas, L=2–12; q=0–4; r=1–2; y=0–6; t=1–4; and u=2–6. Representative examples of such monomers include $CF_2$=$CFO(CF_2)_3OCF(CF_3)CN$, perfluoro(8-cyano-5-methyl-3,6-dioxa-1-octene), and $CF_2$=$CFO(CF_2)_5CN$.

Another suitable cure site component useful in the present invention is a fluoropolymer or fluorinated monomer material containing a halogen that is capable of participation in a peroxide cure reaction. Such a halogen may be present along a fluoropolymer chain and/or in a terminal position. Typically the halogen is bromine or iodine. Copolymerization is preferred to introduce the halogen in a position along a fluoropolymer chain. In this route, a selection of the fluoropolymer components mentioned above are combined with a suitable fluorinated cure site monomer. Such a monomer can be selected, for example, from the general formula Z—$R_f$—$O_x$—CF=$CF_2$, wherein Z is Br or 1, $R_f$ is a substituted or unsubstituted $C_1$–$C_{12}$ fluoroalkylene, which may be perfluorinated and may contain one or more ether oxygen atoms, and x is 0 or 1. When x is 0, examples of the bromo- or iodo- fluorolefins include bromodifluoroethylene, bromotrifluoroethylene, iodotrifluoroethylene, 1-bromo-2,2-difluoroethylene, and 4-bromo-3,3,4,4-tetrafluorobutene-1, and the like. When x is 1, examples of the bromo- or iodo- fluorovinyl ethers include $BrCF_2OCF$=$CF_2$, $BrCF_2CF_2OCF$=$CF_2$, $BrCF_2CF_2CF_2OCF$=$CF_2$, $CF_3CF(Br)CF_2OCF$=$CF_2$, and the like. In addition, non-fluorinated bromo- or iodo- olefins, e.g., vinyl bromide and 4-bromo-1-butene, can be used.

The amount of cure site component in a side chain position of the fluoropolymer is generally from about 0.05 to about 5 mol % (more preferably from 0.1 to 2 mol %).

The cure site component may also occur in the terminal position of a fluoropolymer chain. Chain transfer agents or initiators are used to introduce the halogen in a terminal position. Generally, a suitable chain transfer agent is introduced in the reaction medium during polymer preparation, or derived from a suitable initiator.

Examples of useful chain transfer agents include those having the formula $R_fZ_x$ wherein $R_f$ is a substituted or unsubstituted $C_1$–$C_{12}$ fluoroalkyl radical, which may be perfluorinated, Z is Br or I, and x is 1 or 2. Specific examples involving bromide include: $CF_2Br_2$, $Br(CF_2)_2Br$, $Br(CF_2)_4Br$, $CF_2(Cl)Br$, $CF_3CF(Br)CF_2Br$, and the like.

Examples of useful initiators include $NaO_2S(CF_2)_nX$, wherein X is Br or I, and n is 1 to 10.

The amount of cure site component in a terminal position in the fluoropolymer is generally from about 0.05 to about 5 mol % (more preferably from 0.1 to 2 mol %).

Cure site component combinations are also useful. For example, a fluoropolymer containing a halogen that is capable of participation in a peroxide cure reaction may also contain a nitrogen-containing cure site component such as a nitrile group-containing cure site component. Generally, from about 0.1 to about 5 mol % (more preferably from about 0.3 to about 2 mol %) of the total cure site component is incorporated into the fluoropolymer.

The fluoropolymer compositions of the present invention are cured, at least in part, using an nonfluorinated organo-onium catalyst composition that is the reaction product of an organo-onium (such as a halide, hydroxide, alkoxide, etc.) and an acid or acid salt. The catalyst composition includes a compound having the general formula:

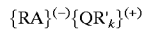

wherein R, A, Q, R', and k are as described above. Preferred anions include those wherein R is selected from alkyl, benzyl, and phenyl, and A is selected from COO, $SO_3$, and wherein A is O in the cases where R is aryl or alkaryl.

The catalyst composition of the invention can be hydrated or anhydrous. The catalyst can be in the form of a complex with water and/or alcohol. The catalyst can be prepared by any known means. One example for catalyst preparation involves converting a commercially-available hydroxide precursor to a benzoate or acetate complex. Another example involves reacting an onium halide with an acid metal salt in a solvent, filtering the precipitated metal halide, and removing the solvent. Other routes will be apparent to the skilled artisan.

More specifically, the RA anion in the catalyst of the present invention may be a carboxylate, alkoxide, sulfate, sulfonate, or phenolate. As used herein, "substituted" means substituted by substituents that do not interfere with the desired product, and "Ph" is phenyl. Suitable anions include the non-perfluorinated anions of the general formula:

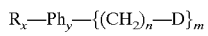

$$R_x-Ph_y-\{(CH_2)_n-D\}_m$$

wherein each $R_x$ is the same or different alkenyl or alkyl of 1 to 10 carbon atoms, which may be substituted or unsubstituted, x is 0 to 5, y is 0 or 1, n is 0 to 10, m is 1 to 5, and D is selected from $COO$, $OSO_3$, $SO_3$, and $O$ (when y is 1), provided that the sum of x and m is 6 or less and provided that x and y are not both zero.

Useful anion examples include Ph—COO, Ph—O, $CH_3-(CH_2)_p-O-SO_3$ when p is 1 to 10, and carboxylates of the general formula R—COO wherein R is alkenyl, an alkyl of 1 to 10 carbon atoms, e.g., acetate or propionate, or an aryl of 6 to 20 carbon atoms. Multi-carboxylates, multi-sulfates, multi-sulfonates, and combinations thereof are also useful, e.g., $^{(-)}OOC-(CH_2)_p-COO^{(-)}$ and $^{(-)}OOC-(CH_2)_n-OSO_3^{(-)}$ wherein p is 0 to 10, and $Ph-((CH_2)_p-COO^{(-)})_q$ wherein p and q are independently 1 to 4. A preferred species of bifunctional carboxylic acid is oxalic acid. In addition, combinations of two or more compounds as described above can be used for RA in Formula 1.

Representative aromatic polyoxy compounds include the non-perfluorinated di-, tri-, and tetraoxybenzenes, naphthalenes, and anthracenes, and bisphenols of the formula:

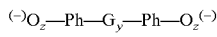

$$^{(-)}O_z-Ph-G_y-Ph-O_z^{(-)}$$

wherein G is a bond or a difunctional aliphatic, cycloaliphatic, or aromatic radical of 1 to 13 carbon atoms, or a thio, oxy, carbonyl, sulfinyl, or sulfonyl radical, G and/or Ph are optionally substituted with at least one chlorine or fluorine atom, y is 0 or 1, each z is independently 1 or 2, and any aromatic ring of the polyoxy compound is optionally substituted with at least one atom of chlorine, or bromine atom, or carboxyl or an acyl radical (e.g., —COR, where R is H or a $C_1$ to $C_8$ alkyl, aryl or cycloalkyl group) or alkyl radical with, for example, 1 to 8 carbon atoms. In the above bisphenol formula that the oxygen groups can be attached in any position (other than number one) in either ring. Blends of two or more such compounds can also be used. The mono and bis complexes of $R_x-Ph-O-QR'_k$ are also useful. A preferred class of these materials includes the bisphenols, such as those having the general formula: $^{(-)}O-Ph-C(CX_3)_2-Ph-O^{(-)}$, wherein X is H, or Cl. When multifunctional acids are used, the mono-, bis-, and multi-complexes with $QR'_k$ can be used.

As is known in the art, an organo-onium is the conjugate acid of a Lewis base (e.g., phosphine, amine, and sulfide) and can be formed by reacting said Lewis base with a suitable. alkylating agent (e.g., an alkyl halide or acyl halide) resulting in an expansion of the valence of the electron donating atom of the Lewis base and a positive charge on the organo-onium compound. The preferred organo-onium compounds for the present invention contain at least one heteroatom, i.e., a non-carbon atom such as P, S, or N, bonded to organic moieties.

One class of quaternary organo-onium compounds particularly useful in the present invention broadly comprises relatively positive and relatively negative ions wherein a phosphorus, sulfur, or nitrogen generally comprises the central atom of the positive ion, and the negative ion is a nonfluorinated alkyl or cycloalkyl acid anion.

Examples of suitable precursor compounds when Q is phosphorous include tetramethylphosphoniums, tributylallylphosphoniums, tributylbenzylphosphoniums, dibutyldiphenylphosphoniums, tetrabutylphosphoniums, tributyl(2-methoxy) propylphosphoniums, triphenylbenzylphosphoniums, and tetraphenylphosphoniums. These phosphoniums can be hydroxides, chlorides, bromides, alkoxides, phenoxides, etc. The tetraalkyl phosphonium hydroxides and tetraalkyl phosphonium alkoxides are preferred.

The quaternary organo-onium compounds can also be used as inorganic salts. For example, selecting A as oxygen and R as a species the same or similar to $QR'_k$, salts of the form $\{QR'_k\}^{(+)}\{AR\}^{(-)}$ or $\{QR'_k\}^{(+)}\{AQR'_k\}^{(-)}$ such as $(QR'_4{}^+)(CO_3{}^{2-})R$, $(QR'_4{}^+)_2CO_3{}^{2-}$, $(QR'_4)_2{}^+SO_4{}^{2-}$ are useful. Likewise, salts of the form $\{QR'_k\}^{(+)}\{OR\}^{(-)}$ such as $(QR'_4)^+OH^-$ are useful. Thus, the group $\{RA\}^{(-)}$ includes such materials as carbonates, sulfates, and other inorganic acid anions, and species the same as or similar to QR'. In this paragraph, R, R', A, Q, k are as described above in reference to Formula 1. More specifically phosphonium salts such as: $(PR'_4{}^+)_2CO_3{}^{2-}$, $(PR'_4)^+OH^-$, $(PR'_4)_2{}^+SO_4{}^{2-}$ and the like can be used in the present invention. Of these materials, the carbonates are preferred.

Another class of phosphonium compounds include those selected from the group consisting of amino-phosphonium, phosphorane (e.g., triarylphosphorane), and phosphorous containing iminium compounds.

The amino-phosphonium compounds useful in the present invention include those described in the art, for example, in U.S. Pat. No. 4,259,463 (Moggi et al.).

The class of phosphonium compounds useful in this invention includes phosphorane compounds such as tri-arylphosphorane compounds; some of the latter compounds are known and are described in the art, see for example, U.S. Pat. No. 3,752,787 (de Brunner), which descriptions are herein incorporated by reference. Such phosphorane compounds are first reacted with an acid to form a salt, which salt is then used as a curative component. Some of the tri-arylphosphorane compounds useful in this invention have the general formula:

(12)

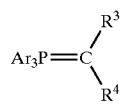

$$Ar_3P=C\begin{matrix}R^3\\R^4\end{matrix}$$

wherein Ar is aryl, selected for example, from phenyl, substituted phenyl, e.g., methoxyphenyl, chlorophenyl, tolyl, and other known groups, e.g. naphthyl. $R^3$ and $R^4$ are selected from the group consisting of (1) separate groups selected individually from (a) hydrogen, methyl, ethyl, propyl, and carbalkoxy ($C_1$–$C_6$ alkyl) in the case of $R^3$, and (b) carbalkoxy ($C_1$–$C_6$ alkyl) cyano, and —$CONH_2$ in the case of $R^4$; and (2) a single group which together with the carbon atom to which the single group is attached form a cyclic group selected from the following:

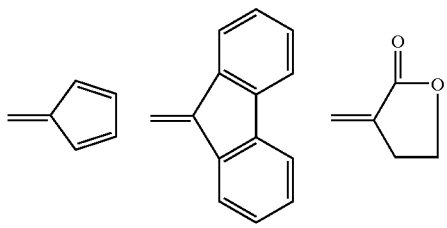

(13)

Representative phosphonium compounds include benzyltris(dimethylamino) phosphonium chloride, and bis(benzyldiphenylphosphine)iminium chloride.

Sulfonium compounds useful in this invention have at least one sulfur atom ionically associated with an anion and covalently bonded to three organic moieties (R') by means of carbon-sulfur covalent bonds. Said organic moieties can be the same or different. The sulfonium compounds may have more than one relatively positive sulfur atom, e.g., $[(C_6H_5)_2S^+(CH_2)_4S^+(C_6H_5)_2]2Cl^-$, and two of the carbon-sulfur covalent bonds may be between the carbon atoms of a divalent organic moiety, i.e., the sulfur atom may be a heteroatom in a cyclic structure.

A class of sulfonium compounds useful in the present invention comprises a salt having the formula:

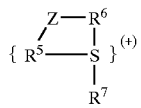

(14)

wherein $R^5$, $R^6$, and $R^7$ can be the same or different, provided that at least one of such groups is aromatic, and such groups can be selected from $C_4$–$C_{20}$ aromatic radicals (e.g., substituted and unsubstituted phenyl, thienyl, and furanyl) and $C_1$–$C_{20}$ alkyl radicals. The alkyl radicals include substituted alkyl radicals (for example, substitutents such as halogen other than fluorine, hydroxy, alkoxy, aryl. Z is selected from oxygen; sulfur; >S=O; >C=O; —SO₂—; —NR⁸—; where $R^8$ is aryl or acyl (such as acetyl, benzoyl, etc.); a carbon-carbon bond; and —CR⁹R¹⁰—where $R^9$ and $R^{10}$ are selected from the group consisting of hydrogen, $C_1$–$C_4$ alkyl radicals, and $C_2$–$C_4$ alkenyl radicals.

Preferably, the sulfonium compounds have at least one aryl group for R'.

When Q is nitrogen, the preferred positive ion has the general formula is $NR'_4$ or $HNR'_3$, wherein R' is as described above. Representative quaternary organo-oniums useful as precursor compounds include phenyltrimethylammoniums, tetrapentylammoniums, tetrapropylammoniums, tetrahexylammoniums, tetraheptylammoniums, tetramethylammoniums, tetrabutylammoniums, tributylbenzyl ammoniums, tributylallylammoniums, tetrabenzylammoniums, tetraphenylammoniums, diphenyl diethylamino ammoniums, triphenylbenzylammoniums, 8-benzyl-1,8-diazabicyclo[5.4.0]undec-7-eniums, benzyltris(dimethylamino) phosphoniums, and bis(benzyldiphenyl phosphine)iminiums. These ammoniums can be hydroxides, chlorides, bromides, alkoxides, phenoxides, etc. Of these positive ions, tetrabutylammonium and tetraphenylammonium are preferred. When Q is As or Sb, the preferred positive ions include tetraphenylarsonium chloride and tetraphenylstibonium chloride. Overall, the tetraalkylphosphonium compounds are more preferred for the positive ion of the catalyst.

Mixtures of organo-onium compounds are also useful in this invention.

The precursors described above are generally commercially available (e.g., from Aldrich Chemicals, Milwaukee, Wis.) or may be prepared by procedures known in the art.

The acids or salts of hydrocarbons useful in preparing the catalyst of the present invention have the general formula RCOOM, RSO₃M, ROSO₃M, or ROM. In these formulas, R is as described above with Formula (1), and M is hydrogen, or an alkali or alkaline earth metal. Representative materials for R are the carboxylates, sulfates, sulfonates, and phenolates described above.

In addition, blends of two or more catalyst compounds as described above, which includes blends of two or more RA groups and/or two or more $QR'_k$ groups, can be used.

The catalyst composition of the present invention can be prepared by any suitable method. For example, the two components of the active complex used as the catalyst composition in the present invention, $\{RA\}^{(-)}\{QR'_k\}^{(+)}$, can be incorporated separately as an acid or a salt, e.g., RAX wherein X is selected from hydrogen or the alkali or alkaline earth metals, of which H, K, Na, and NH₄, are preferred, and $QR'_kZ$, wherein Z is selected from an anion, which may be organic or inorganic, preferably Cl, Br, OH, OR³, or SO₄. The two components can be added to the inventive elastomer gum separately or as a mixture. In this method, the active complex is formed in situ during processing, heating, and curing. To avoid contamination and the inclusion of extractables, which is especially important for clean applications (e.g., semiconductors), the complexes should be prepared before incorporation into the fluoroelastomer composition, and the resulting salts, XZ, should be filtered or washed out before the active complex is incorporated into the elastomer gum. Other suitable methods, which are known in the art, also may be used to prepare the catalyst composition. For example, the two components of the catalyst composition can be dissolved into a suitable solvent (e.g., an alcohol) before precipitating and filtering out the resulting salt, XZ. Salt formation can be avoided by reacting the onium component as the onium-hydroxide or onium-alkoxide with the acid component of the catalyst composition (e.g., reacting Bu₄NOH with RCOOH). The active complexes can be incorporated into the elastomer gum when dissolved in a solvent or as a dried compound. An excess of the QR'$_k$ material (e.g., tetraalkyl phosphonium chloride) or the free acid (e.g., RAH) does not detrimentally affect the properties of the polymer.

An effective amount of the selected curative compound ($\{RA\}^{(-)}\{QR'_k\}^{(+)}$) is used to crosslink the fluoropolymer. When the amount of curative is too low, the fluoropolymer may not crosslink sufficiently to develop the desired physical properties and/or may crosslink more slowly than desired. When the amount of curative is too high, the fluoropolymer may crosslink into a material that is less compliant than desired and/or may crosslink too rapidly for the desired process conditions. The selection of a particular composition can affect the amount of curative desired. For example, the type and/or amount of filler selected may retard or accelerate curing relative to a similar, but unfilled, composition, requiring an appropriate adjustment in the amount of curative that is known to those skilled in the art.

The composition of the fluoropolymer also affects the amount of one or more curatives. For example, when a blend of a nitrile containing fluoropolymer and another fluoropolymer lacking nitrile cure sites is used, an effective amount of a first selected curative compound is used to crosslink the fluoropolymer having interpolymerized units derived from a nitrile group-containing monomer together with an effective amount of a second selected curative compound used to crosslink the other fluoropolymer. The first and second selected curatives may have the same or different composition. That is, either one or both selected curatives may function to crosslink either one or both fluoropolymers.

Generally, the effective amount of curative, which may include more than one composition, is in the range of 0.2 to 10 millimoles curative per hundred parts of gum (mmhr) (more preferably 0.5 to 5 mmhr).

One of the advantages of the present invention is controllable cure rheology. After an initial drop in torque, corresponding to an increase in temperature of the material, the inventive compositions have available a relatively long period of time ("induction time") after which the torque increases rapidly to its final or maximum value. The rapid increase in the torque corresponds to a rapid increase in the viscosity of the composition as it crosslinks. The induction time is controllable from seconds to several minutes. This allows a sufficient amount of induction time for a particular inventive composition to be formed or molded before the onset of cure. This rheology also provides a rapid completion of the cure cycle after the cure onset, so the cure cycle is not unnecessarily prolonged. Thus, compositions of the present invention can be completely formed or molded rapidly, cured to a state that they can be handled without damage, and removed from the mold.

The fluoropolymer composition curing can also be modified by using other types of curatives along with the catalyst of the present invention. Examples of such curatives are known and include bis-aminophenols (e.g., as described in U.S. Pat. Nos. 5,767,204 and 5,700,879), bis-amidooximes (e.g., as described in U.S. Pat. No. 5,621,145), and ammonium salts (e.g., as described in U.S. Pat. No. 5,565,512). In addition, organometallic compounds of arsenic, antimony and tin can be used, for example as described in U.S. Pat. Nos. 4,281,092; and 5,554,680. Particular examples include allyl-, propargyl-, triphenyl- allenyl-, and tetraphenyltin and triphenyltin hydroxide.

The fluoroelastomer compositions of the invention can be cured using one or more ammonia-generating compounds along with the catalysts described above. "Ammonia-generating compounds" include compounds that are solid or liquid at ambient conditions but that generate ammonia under conditions of cure. Such compounds include, for example, hexamethylene tetramine (urotropin), dicyandiamide, and metal-containing compounds of the formula:

$$A^{w+}(NH_3)_x Y^{w-} \quad (15)$$

wherein $A^{w+}$ is a metal cation such as $Cu^{2+}$, $Co^{2+}$, $Co^{3+}$, $Cu^+$, and $Ni^{2+}$; w is equal to the valance of the metal cation; $Y^{w-}$ is a counterion, typically a halide, sulfate, nitrate, acetate or the like; and x is an integer from 1 to about 7.

Also useful as ammonia-generating compounds are substituted and unsubstituted triazine derivatives such as those of the formula:

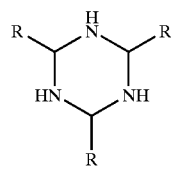

(16)

wherein R is a hydrogen or a substituted or unsubstituted alkyl, aryl, or aralkyl group having from 1 to about 20 carbon atoms. Specific useful triazine derivatives include hexahydro-1,3,5-s-triazine and acetaldehyde ammonia trimer.

The fluoroelastomer compositions of the invention, including the nitrogen containing cure site monomer-containing fluoropolymer alone, can be cured using one or more peroxide curatives along with the catalysts described above. Suitable peroxide curatives generally are those which generate free radicals at curing temperatures, such as those described in WO 99/48939, the disclosure of which is herein incorporated by reference. Dialkyl peroxide and bis(dialkyl peroxide), each of which decomposes at a temperature above 50° C., are especially preferred. In many cases it is preferred to use a di-tertiarybutyl peroxide having a tertiary carbon atom attached to peroxy oxygen atom. Among the most useful peroxides of this type are 2,5-dimethyl-2,5-di(tertiarybutylperoxy)hexyne-3 and 2,5-dimethyl-2,5-di(tertiarybutylperoxy)hexane. Other peroxides can be selected from such compounds as dicumyl peroxide, dibenzoyl peroxide, tertiarybutyl perbenzoate, a,a'-bis(t-butylperoxy-diisopropylbenzene), and di[1,3-dimethyl-3-(t-butylperoxy)-butyl]carbonate. Generally, about 1 to 3 parts of peroxide per 100 parts of perfluoroelastomer is used.

Another curative useful in the present invention has the general formula:

$$CH_2=CH-R-CH=CH_2,$$

wherein one or more H atoms may be replaced with halogen atoms other than F, and R is a $C_1-C_8$ linear or branched alkylene, cycloalkylene, or oxyalkylene. Similarly, polymers containing pendant groups of $CH_2=CHR-$ are also useful as curatives in the present invention. Such curatives are described, for example, in U.S. Pat. No. 5,585,449.

The combination of catalyst and curative is generally from about 0.01 to about 10 mol % (more preferably from about 0.1 to about 5 mol %) of the total fluoropolymer amount.

The fluoropolymer compositions can include any of the adjuvants commonly employed in curable fluoropolymer formulations. For example, one material often blended with a fluoropolymer composition as a part of a curative system is a coagent (sometimes also referred to as a co-curative) composed of a polyunsaturated compound that is capable of cooperating with the peroxide curative to provide a useful cure. These coagents are particularly useful in combination with a peroxide curative. The coagent(s) can generally be added in an amount equal to between 0.1 and 10 parts coagent per hundred parts fluoropolymer (phr), preferably between 1 and 5 phr. Examples of coagents useful with the organo-onium compound of the present invention include triallyl cyanurate; triallyl isocyanurate; tri(methylallyl) isocyanurate; tris(diallylamine)-s-triazine; triallyl phosphite; N,N-diallyl acrylamide; hexaallyl phosphoramide; N,N,N', N'-tetraalkyl tetraphthalamide; N,N,N',N'- tetraallyl malonamide; trivinyl isocyanurate; 2,4,6-trivinyl methyltrisiloxane;

and tri(5-norbornene-2-methylene)cyanurate. Particularly useful is triallyl isocyanurate. Other useful coagents include the bis-olefins disclosed in EP 0 661 304 A1, EP 0 784 064 A1, EP 0 769 521 A1, and U.S. Pat. No. 5,585,449.

The optional alcohol has the general formula $R^2$—OH, wherein $R^2$ is alkyl group having from 1 to 20 carbon atoms, more preferably 6 to 12 carbon atoms. $R^2$ can be fluorinated, e.g., $R_f$—$CH_2$—OH or $R_f$—$CH_2CH_2$—OH wherein $R_f$ is a perfluoroalkyl, e.g., $C_nF_{2n+1}$ where n is 1 to 20, or perfluorocycloalkyl, e.g., $C_mF_{2m-1}$ where m is 3 to 20, or a $C_1$–$C_{20}$ fluoroalkenyl. $R_f$ can also be partially fluorinated. As used herein, "partially fluorinated" means where one or more F atoms in the alkyl group is replaced with H, Cl, Br, or I, provided at least one F atom remains. $R_f$ can also contain at least one heteroatom, i.e., a non-carbon atom such as O, P, S, or N.

While the addition of alcohol is not required, it may be helpful to modify the viscosity and cure characteristics of the composition. The alcohol is selected to be compatible in the overall composition. The alcohol should also remain in a mixture of fluoropolymer with catalyst during milling operations. The alcohol preferably evaporates during subsequent processing at higher temperatures, such as during post-cure operations. Examples of presently preferred alcohols include octanol and decanol. An effective amount of alcohol is used in the curative system. This amount is determined by several factors including the desired ratio of alcohol to catalyst, the particular alcohol chosen, and the milling temperature. The particular level for a selected composition is normally a matter of routine experimentation. Generally, this amount is in the range of 0.01 to 10 (more preferably 0.5 to 5) parts by weight alcohol per hundred parts by weight fluoropolymer.

Thus, a particular composition of the present invention may include two or more fluoropolymer(s) (provided that at least one fluoropolymer includes interpolymerized units derived from a nitrogen-containing monomer), a catalyst composition of Formula (1), a peroxide curative selected to crosslink one or more than one of the fluoropolymer(s), optionally a coagent such as triallyl isocyanurate, and optionally, an alcohol.

Additives such as carbon black, stabilizers, plasticizers, lubricants, fillers, and processing aids typically utilized in fluoropolymer compounding can be incorporated into the compositions, provided that they have adequate stability for the intended service conditions. In particular, low temperature performance can be enhanced by incorporation of perfluoropolyethers. See, e.g., U.S. Pat. No. 5,268,405.

Carbon black fillers are typically also employed in fluoropolymers as a means to balance modulus, tensile strength, elongation, hardness, abrasion resistance, conductivity, and processability of the compositions. Suitable examples include MT blacks (medium thermal black) designated N-991, N-990, N-908, and N-907; FEF N-550; and large particle size furnace blacks. When large size particle black is used, 1 to 70 parts filler per hundred parts fluoropolymer (phr) is generally sufficient.

Fluoropolymer fillers may also be present in the compositions. Generally, from 1 to 50 phr of fluoropolymer filler is used. The fluoropolymer filler can be finely divided and easily dispersed as a solid at the highest temperature used in fabrication and curing of the inventive composition. By solid, it is meant that the filler material, if partially crystalline, will have a crystalline melting temperature above the processing temperature(s) of the curable composition(s). The preferred way to incorporate fluoropolymer filler is by blending latices. This procedure, including various kinds of fluoropolymer filler, is described in U.S. Ser. No. 09/495,600, filed 01, Feb. 2000, the disclosure of which is herein incorporated by reference.

One or more acid acceptors can also be added to the inventive composition. However, where the presence of extractable metallic compounds is undesirable (such as for semiconductor applications) the use of inorganic acid acceptors should be minimized, and preferably avoided altogether. Useful acid acceptors include, for example, zinc oxide, calcium hydroxide, calcium carbonate, magnesium oxide, silica, etc.

The curable fluoropolymer compositions of the invention may also be combined with other curable fluoropolymer compositions such as peroxide-curable fluoropolymer compositions. These additional curable fluoropolymer compositions may also employ small amounts of cure site monomers as a comonomer. Suitable cure site monomers are those which, when combined with a curative (e.g., a peroxide) and, preferably a coagent, will provide a cured composition. Preferably these cure site monomers include at least one halo group (e.g., a bromo or an iodo group).

The curable fluoropolymer compositions can be prepared by mixing one or more fluoropolymer(s), the catalyst, any selected additive or additives, any additional curatives (if desired), and any other adjuvants (if desired) in conventional rubber processing equipment. The desired amounts of compounding ingredients and other conventional adjuvants or ingredients can be added to the unvulcanized fluorocarbon gum stock and intimately admixed or compounded therewith by employing any of the usual rubber mixing devices such as internal mixers, (e.g., Banbury mixers), roll mills, or any other convenient mixing device. The temperature of the mixture during the mixing process typically should not rise above about 120° C. During mixing, it is preferable to distribute the components and adjuvants uniformly throughout the gum for effective cure.

The mixture is then processed and shaped, such as by extrusion (e.g., into the shape of a tube or a hose lining) or by molding (e.g., in the form of an O-ring seal). The shaped article can then be heated to cure the gum composition and form a cured article.

Molding or press curing of the compounded mixture usually is conducted at a temperature sufficient to cure the mixture in a desired time duration under a suitable pressure. Generally, this is between about 95° C. and about 230° C., preferably between about 150° C. and about 205° C., for a period of from about 1 minute to 15 hours, typically from 5 minutes to 30 minutes. A pressure of between about 700 kPa and about 21,000 kPa is usually imposed on the compounded mixture in a mold. The molds first may be coated with a release agent and prebaked.

The cure rheology of the compositions of the present invention maintain near their minimum viscosities during typical processing operations, providing improved scorch resistance and greater options in processing conditions over known materials. Significantly, the advantages in processing do not detrimentally affect the resulting physical properties of the final cured product and the resultant fluoropolymers of the present invention have excellent high-temperature properties and low compression set values.

The molded mixture or press-cured article is then usually post-cured (e.g., in an oven) at a temperature and for a time sufficient to complete the curing, usually between about 150° C. and about 300° C., typically at about 232° C., for a period of from about 2 hours to 50 hours or more, generally increasing with the cross-sectional thickness of the article. For thick sections, the temperature during the post cure is usually raised gradually from the lower limit of the range to the desired maximum temperature. The maximum temperature used is preferably about 300° C., and this value is held for about 4 hours or more. This post-cure step generally completes the cross-linking and may also release residual volatiles from the cured compositions. One example of a suitable post-cure cycle involves exposing molded parts to heat under nitrogen using six stages of conditions. First, the temperature is increased from 25 to 200° C. over six hours, then the parts are held at 200° C. for 16 hours, after which the temperature is increased from 200 to 250° C. over 2 hours. Then the parts are held at 250° C. for 8 hours, after which the temperature is increased from 250 to 300° C. over 2 hours. Then the parts are held at 300° C. for 16 hours. Finally, the parts are returned to ambient temperature such as by shutting off the oven heat.

The fluoropolymer compositions are useful in production of articles such as O-rings, gaskets, tubing, and seals. Such articles are produced by molding a compounded formulation of the fluoropolymer composition with various additives under pressure, curing the article, and then subjecting it to a post-cure cycle. The curable compositions formulated without inorganic acid acceptors are particularly well suited for applications such as seals and gaskets for manufacturing semiconductor devices, and in seals for high temperature automotive uses.

The invention will now be described further by way of the following examples.

EXAMPLES

The indicated results were obtained using the following test methods, unless otherwise noted. The test results appear in the tables below.

Cure Rheology

Tests were run on uncured, compounded samples using a Monsanto Moving Die Rheometer (MDR) Model 2000 in accordance with ASTM D 5289-93a at 177° C., no pre-heat, 30 minute elapsed time, and a 0.5 degree arc. Both the minimum torque ($M_L$) and highest torque attained during a specified period of time when no plateau or maximum torque was obtained ($M_H$) were measured. Also measured were the time for the torque to increase 2 units above $M_L$ ("$t_s2$"), the time for the torque to reach a value equal to $M_L+0.5(M_H-M_L)$ ("t'50"), and the time for the torque to reach $M_L+0.9(M_H-M_L)$ ("t'90").

Mooney Scorch

Measurements were taken at 121° C., following the procedures described in ASTM D 1646. Minimum viscosity (units), and the time in minutes to increase to various viscosity levels were recorded. For example, the time to reach a 3, 12, and 18 unit rise typically was recorded.

Press-Cure

Sample sheets measuring 150×150×2.0 mm were prepared for physical property determination by pressing at about 6.9 Mega Pascals (MPa) for 30 minutes at 177° C., unless otherwise noted.

Post-Cure

Press-cured sample sheets were exposed to heat under nitrogen using the following six stages of conditions: 25 to 200° C. over 6 hours; 200° C. for 16 hours; 200 to 250° C. over 2 hours; 250° C. for 8 hours; 250 to 300° C. over 2 hours; and 300° C. for 16 hours. The samples were returned to ambient temperature before testing.

Heat Aging

Press-cured and post-cured sample sheets were exposed to heat in air for 70 hours at 290° C. and then returned to ambient temperature before testing.

Physical Properties

Tensile Strength at Break, Elongation at Break, and Modulus at 100% Elongation were determined using ASTM D 412-92 on samples cut from the press-cure or post-cure sheet with ASTM Die D. Units are reported MPa.

Hardness

Samples were measured using ASTM D 2240-85 Method A with a Type A-2 Shore Durometer. Units are reported in points on the Shore A scale.

Compression set

O-ring samples were measured using ASTM 395-89 Method B. The O-rings had a cross-sectional thickness of 0.139 in. (3.5 mm.). Results are reported as a percentage of the original deflection.

All materials were commercially available from Aldrich Chemical Co., Milwaukee, Wis. unless otherwise indicated.

Catalyst Preparation

A tributyl-(2-methoxy)-propyl phosphonium benzoate catalyst was prepared by reacting 0.55 g benzoic acid, 0.64 g $NaOCH_3$ solution in methanol (25% solids), and 1.0 g tributyl-(2-methoxy)-propyl phosphonium chloride in methanol (85% solids), and 12 g methanol. The resulting NaCl was decanted from the catalyst and the remaining methanol was stripped.

A mixture of 98.66 g of a 40 weight percent (wt %) solution in water of tetrabutyl phosphonium hydroxide (0.143 mol) was neutralized in a 500 mL flask with 8.6 g of acetic acid (99.7% purity). The mixture was swirled for about 5 minutes (pH paper indicated a pH of 9). Water was removed from the mixture using a rotary evaporator (rotavap) using a bath temp of around 50° C. until no more water condensed. Ethanol (100 mL) was added to the flask and the solution was stripped on the rotavap until no more condensation occurred. Another 100 mL of ethanol was added to the solution, following by stripping on the rotovap until no more condensation occurred. This yielded 59.95 g of a clear, slightly viscous oil. NMR analysis revealed that this oil contained 19% ethanol. Karl-Fisher titration revealed that this oil contained 1.8 wt % water, along with the desired tetrabutyl phosphonium acetate.

A tetrabutyl phosphonium carbonate catalyst was prepared by saturating a 40% solution in water of tetrabutyl phosphonium hydroxide with dry ice. The water was removed by vacuum distillation (rotavap) followed by two consecutive vacuum strips from ethanol.

In the following examples, cure rheology tests were run on the uncured, compounded samples. Sheets of the compounded admixtures were pressed cured and tested and subsequently post-cured. The post-cured samples were tested, and then heat aged and tested, and finally tested for compression set. The test results are included in Table 1 (below).

Examples 1 and 2

A fluoroelastomer gum was prepared by emulsion polymerization which contained 62.2 mole percent tetrafluoroethylene (mol % TFE), 36.6 mol % perfluoromethyl vinyl ether (PMVE), and 1.2 mol % of a nitrile group-containing cure site monomer, $CF_2=CFO(CF_2)_5CN$. Then 3 millimoles tributyl-(2-methoxy)-propyl phosphonium benzoate catalyst was compounded with 100 g of the fluoropolymer gum, 0.8 g n-decanol, and 15 grams of FEF N550 carbon black.

In Example 2, a fluoropolymer gum was prepared and compounded as above except that 3 millimoles of a tributyl-(2-methoxy)-propyl phosphonium acetate catalyst was substituted.

Example 3

A fluoropolymer was prepared by emulsion polymerization that contained 62.0 mol % TFE, 37.4 mol % PMVE, and 0.6 mol % bromotrifluoroethylene. This fluoropolymer (30 g) was compounded with 70 g of the fluoroelastomer of Example 1, 1.5 mmhr of the catalyst of Example 1, 0.6 mmhr peroxide (2,5-dimethyl-2,5-di(t-butyperoxy) hexane, available as Varox® DBPH from R.T. Vanderbilt Co., Norwalk, Conn.), 1 g triallylisocyanurate (TAIC), 15 phr FEF N550 carbon black, and 0.4 g n-octanol.

Examples 4 and 5

In Example 4, a fluoroelastomer gum was prepared by emulsion polymerization which contained 62.2 mole percent tetrafluoroethylene (mol % TFE), 36.6 mol % perfluoromethyl vinyl ether (PMVE), and 1.2 mol % of a nitrile group-containing cure site monomer, $CF_2=CFO(CF_2)_5CN$. Then 0.75 g tetrabutyl phosphonium carbonate catalyst was compounded with 100 g of the fluoropolymer gum, and 15 g of FEF N550 carbon black. Samples were press-cured for 12 minutes, rather than 30.

In Example 5, a fluoropolymer gum was prepared and compounded as in Example 4, except that 4 g $TiO_2$ was included and the carbon black was omitted. Samples were press-cured as in Example 4. Samples were post-cured for 24 h in nitrogen at 132° C. followed by 4 h in air at 300° C. The samples were returned to ambient temperature before testing.

In the following table, N/M indicates that the property was not measured. Example 3 was heat aged for 70 h at 270° C. rather than the 290° C. of Examples 1 and 2. The asterisk on the third compression set test for Example 3 indicates that 70 h at 270° C. was used, rather than 290° C.

A number of embodiments of the invention have been described. Nevertheless, it will be understood that various modifications may be made without departing from the spirit and scope of the invention.

TABLE 1

| Example: | Results | | | | |
|---|---|---|---|---|---|
| | 1 | 2 | 3 | 4 | 5 |
| Cure Rheology: | | | | | |
| $M_L$ (N m) | 0.0926 | 0.0994 | 0.1333 | 0.2576 | 0.4474 |
| $M_H$ (N m) | 0.8361 | 0.8406 | 0.9943 | 1.2135 | 1.5332 |
| $t_S2$ (min) | 4.55 | 2.36 | 0.9 | 2.67 | 0.92 |
| t'50 (min) | 6.72 | 3.17 | 1.39 | 3.38 | 1.25 |
| t'90 (min) | 22.11 | 8.53 | 5.36 | 5.95 | 2.26 |
| Mooney Scorch: | | | | | |
| M1 (N m) | 7.095 | 5.932 | N/M | N/M | N/M |
| t3 (min) | >120 | >120 | N/M | N/M | N/M |
| t-10 (min) | >120 | >120 | N/M | N/M | N/M |
| t-18 (min) | >120 | >120 | N/M | N/M | N/M |
| Press & Post Cured: | | | | | |
| TS at Break (MPa) | 16.42 | 15.73 | 13.96 | 14.94 | 11.35 |
| Elongation at Break (%) | 114 | 110 | 145 | 161 | 240 |
| 100% Modulus (MPa) | 12.69 | 13.11 | 7.81 | 5.66 | 3.79 |
| Shore A | 75 | 74 | 74 | 70 | 71 |

TABLE 1-continued

| Example: | Results | | | | |
|---|---|---|---|---|---|
| | 1 | 2 | 3 | 4 | 5 |
| Hardness Heat Aged:* | | | | | |
| TS at Break (MPa) | 14.09 | 14.95 | 9.86 | 13.92 | 17.19 |
| Elongation at Break (%) | 150 | 153 | 211 | 174 | 273 |
| 100% Modulus (MPa) | 7.14 | 8.12 | 3.50 | 6.70 | 4.39 |
| Shore A Hardness | 73 | 71 | 71 | 73 | 76 |
| Weight Loss (%) | 1.4 | 1.1 | 1.4 | N/M | N/M |
| Compression Set: | | | | | |
| 70 hours at 200° C. (%) | 11.6 | 10.9 | 32.8 | N/M | N/M |
| 70 hours at 230° C. (%) | 13.4 | 15.5 | 59.8 | 27.5 | 27.8 |
| 70 hours at 290° C. (%) | 27.4 | 28.7 | *91.2 | N/M | N/M |
| 70 hours at 316° C. (%) | N/M | N/M | N/M | 48.9 | 50.4 |

What is claimed is:

1. A composition consisting essentially of:

(a) a perfluoropolymer comprising interpolymerized units derived from a nitrogen-containing cure site monomer;

(b) a non-fluorinated catalyst composition that includes a compound having the general formula: $\{R(A)_n\}^{(-n)}$ $\{QR'_k{}^{(+)}\}_n$ or the precursors thereof added separately or as a mixture;

wherein R is hydrogen, a $C_1$–$C_{20}$ alkyl or alkenyl, $C_3$–$C_{20}$ cycloalkyl or cycloalkenyl, or $C_6$–$C_{20}$ aryl or aralkyl, $\{R(A)_n\}^{(-n)}$ is an acid anion or an acid derivative anion, n is the number of A groups in the anion, Q is phosphorus, sulfur, nitrogen, arsenic, or antimony, each R' is, independently, hydrogen or a substituted or unsubstituted $C_1$–$C_{20}$ alkyl, aryl, aralkyl, or alkenyl group, provided that when Q is nitrogen and the only fluoropolymer in the composition consists essentially of a terpolymer of TFE, a perfluorovinylether, and a perfluorovinylether cure site monomer comprising a nitrile group not every R' is H, and k is one greater than the valence of Q, and, optionally, an additional curative material selected from the group consisting of: ammonium salts, ammonia-generating compounds, substituted triazine derivatives, unsubstituted triazine derivatives, bis-amidooximes, and organotin compounds; and optionally a coagent;

optionally (c) an alcohol of the general formula $R^2$—OH, wherein $R^2$ is an alkyl group having from 1 to 20 carbon atoms, and wherein $R^2$ is optionally partially fluorinated; and optionally (d) a filler selected from fluoropolymer filler, carbon black, and combinations thereof.

2. A composition according to claim 1 wherein A is selected from the group consisting of: COO, O when R is hydrogen, aryl, or alkylaryl, $SO_3$, $SO_2$, $SO_2NH$, $PO_3$, $CH_2OPO_3$, $(CH_2O)_2PO_2$, $C_6H_4O$, $OSO_3$,

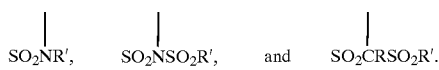

3. A composition according to claim 1 wherein a precursor of R(A)$_n$ has the general formula selected from the group consisting of: RCOOM, ROSO$_3$M, RSO$_3$M, and ROM, wherein M is hydrogen, or an alkali or alkaline earth metal.

4. A composition according to claim 1 wherein R(A)$_n$ is selected from the group consisting of: C$_6$H$_5$COO; PhO; CH$_3$—(CH$_2$)$_p$—O—SO$_3$ where p is 1 to 10; RCOO wherein R is an alkenyl, a C$_1$–C$_{10}$ alkyl, or a C$_6$–C$_{20}$ aryl; $^{(-)}$OOC—(CH$_2$)$_p$—COO$^{(-)}$ wherein p is 0 to 10; and Ph—((CH$_2$)$_p$—COO$^{(\pm)}$)$_q$ wherein p and q are independently 1 to 4.

5. A composition according to claim 1 wherein R(A)$_n$ is selected from the general formula $^{(+)}$O$_x$—Ph—G$_y$—Ph—O$_z$$^{(-)}$ wherein G is a bond or a difunctional aliphatic, cycloaliphatic, or C$_1$–C$_{13}$ aromatic radical, or a thio, oxy, carbonyl, sulfinyl, or sulfonyl radical, G and/or Ph are optionally substituted with at least one Cl atom, y is 0 or 1, z is 1 or 2, and any aromatic ring of the polyoxy compound is optionally substituted with at least one atom of Cl, or Br atom, or carboxyl, or an acyl radical, or an alkyl radical; and blends of two or more such compounds.

6. A composition according to claim 1 wherein R(A)$_n$ is selected from the general formula $^{(-)}$O—Ph—C(CX$_3$)$_2$—Ph—O$^{(-)}$, wherein X is H, or Cl; and blends of two or more such compounds.

7. A composition according to claim 1 wherein a precursor of QR'$_k$ is selected from the group consisting of tetramethylphosphoniums, tributylallylphosphoniums, tributylbenzylphosphoniums, dibutyldiphenylphosphoniums, tetrabutylphosphonium, tributyl(2-methoxy) propylphosphoniums, triphenylbenzylphosphoniums, and tetraphenylphosphoniums.

8. A composition according to claim 1 wherein a precursor of QR'$_k$ is selected from the group consisting of phenyltrimethylammoniums, tetrapentylammoniums, tetrapropylammoniums, tetrahexylammoniums, tetraheptylammoniums, tetramethylammoniums, tetrabutylammoniums, tributylbenzyl ammoniums, tributylallylammoniums, tetrabenzylammoniums, tetraphenylammoniums, diphenyl diethylamino ammoniums, triphenylbenzylammoniums, 8-benzyl-1,8-diazabicyclo[5.4.0]undec-7-eniums, benzyltris (dimethylamino) phosphoniums, and bis(benzyldiphenyl phosphine)iminiums.

9. A composition of claim 1 wherein the catalyst composition is prepared in situ.

10. A composition according to claim 1 wherein the catalyst composition is prepared from components dissolved in a solvent.

11. A composition according to claim 1 wherein the perfluoropolymer comprises interpolymerized units derived from (i) tetrafluoroethylene, and optionally (ii) one or more perfluorovinyl ethers of the formula: CF$_2$=CFO(R$^2{}_f$O)$_a$(R$^3{}_f$O)$_b$R$^4{}_f$ wherein R$^2{}_f$ and R$^3{}_f$ are the same or are different linear or branched perfluoroalkylene groups of 1–6 carbon atoms; a and b are, independently, 0 or an integer from 1 to 10; and R$^4{}_f$ is a perfluoroalkyl group of 1–6 carbon atoms.

12. A composition according to claim 11 wherein the perfluoropolymer further comprises interpolymerized units derived from perfluoroolefins.

13. A composition according to claim 1 wherein said cure site monomer is a fluorinated olefin.

14. A composition according to claim 1 wherein said cure site monomer is a nitrile-containing monomer having the formula CF$_2$=CFO(CF$_2$)$_L$CN; CF$_2$=CFO(CF$_2$)$_u$OCF(CF$_3$)CN; CF$_2$=CFO[CF$_2$CF(CF$_3$)O]$_q$(CF$_2$O)$_y$CF(CF$_3$)CN; or CF$_2$=CF[OCF$_2$CF(CF$_3$)]$_r$O(CF$_2$)$_t$CN; wherein L=2–12; q=0–4, r=1–2; y=0–6; t=1–4, and u=2–6.

15. The composition of claim 1 wherein the perfluoropolymer is selected from a fluoroelastomer and a fluoroplastic.

16. The composition of claim 1 wherein the composition has an induction time below about 15 minutes at a temperature of about 175° C.

17. The composition or claim 1 wherein the composition has a scorch resistance greater than the scorch resistance of a comparative composition tested at the same temperature, which comparative composition has the same perfluoropolymer with a urotropin curative.

18. A shaped article comprising the perfluoropolymer composition of claim 1.

19. The composition according to claim 1, wherein the curative increases MDR torque in the fluoropolymer composition at 177° C. by at least about 0.01 Nm.

20. The composition of claim 1 wherein the coagent is selected from the group consisting of: triallyl cyanurate; triallyl isocyanurate; tri(methylallyl) isocyanurate; tris (diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate.

21. The composition of claim 1 wherein R(A)$_n$ is selected from the group consisting of: acetate, benzoate, and carbonate.

22. The composition of claim 1 wherein {R(A)$_n$}$^{(-n)}$ {QR'$_k{}^{(+)}$}$_n$ is selected from the group consisting of: (QR'$_k$)$^{(+)}$(AQR'$_k$)$^{(-)}$, (QR'$_4{}^+$)(CO$_3{}^{2-}$)R, (QR'$_4{}^+$)$_2$CO$_3{}^{2-}$, (QR'$_4{}^+$)$_2$SO$_4{}^{2-}$, (QR'$_4$)$^+$OH$^-$, (PR'$_4{}^+$)$_2$CO$_3{}^{2-}$, (PR'$_4$)'OH$^-$, and (PR'$_4{}^+$)$_2$SO$_4{}^{2-}$.

23. The composition of claim 1 wherein QR'$_k$ is selected from the group consisting of: tetrabutylphosphonium and tributyl(2-methoxy)propylphosphonium.

24. A method of making a perfluoropolymer composition comprising forming a mixture consisting essentially of a perfluoropolymer having interpolymerized units derived from a nitrogen-containing cure site monomer, a nonfluorinated catalyst composition comprising a compound having the formula: {R(A)$_n$}$^{(-n)}${QR'$_k{}^{(+)}$}$_n$ or the precursors thereof added separately or as a mixture, wherein R is hydrogen, a C$_1$–C$_{20}$ alkyl or alkenyl, C$_3$–C$_{20}$ cycloalkyl or cycloalkenyl, or C$_6$–C$_{20}$ aryl or alkylaryl, {R(A)$_n$}$^{(-n)}$ is an acid anion or an acid derivative anion group, which may be heterocyclic, n is the number of A groups in the anion, Q is P, S, N, As, or Sb, and each R' is, independently, hydrogen or a substituted or unsubstituted C$_1$–C$_{20}$ alkyl, aryl, aralkyl, or alkenyl group, provided that when Q is nitrogen and the only fluoropolymer in the composition consists essentially of a terpolymer of TFE, a perfluorovinylether, and a perfluorovinylether cure site monomer comprising a nitrile group, not every R' is H, and k is one greater than the valence of Q;

optionally, an additional curative material selected from the group consisting of: ammonium salts, ammonia-generating compounds, substituted triazine derivatives, unsubstituted triazine derivatives, bis-amidooximes, and organotin compounds;

optionally a coagent;

optionally a filler selected from the group consisting of fluoropolymer filler, carbon black, and combinations thereof, and optionally in the presence of an alcohol of the general formula $R^2$—OH, wherein $R^2$ is a $C_6$–$C_{20}$ alkyl group.

25. The method of claim 24 further comprising:
   a) shaping the mixture;
   b) optionally curing the shaped mixture; and
   c) optionally heat aging the cured mixture.

26. A method according to claim 25 wherein the catalyst is added in a form selected from the group consisting of: a compound and a mixture of catalyst precursors.

27. A method according to claim 25 wherein individual components of the catalyst are separately added to the fluoropolymer composition.

28. A method according to claim 25 wherein the step of curing further comprises press-curing and optionally post-curing.

29. A cured article prepared according to the method of claim 25.

30. A method for increasing the induction period in a curable perfluoropolymer composition comprising the steps of:
   a) providing a perfluoropolymer comprising interpolymerized units derived from a nitrogen-containing cure site monomer; and
   b) incorporating, into the fluoropolymer, a nonfluorinated catalyst composition that consists essentially of a compound having the general formula: $\{RA\}^{(-n)}\{QR'_k{}^{(+)}\}_n$ or the precursors thereof added separately or as a mixture, wherein R is hydrogen, a $C_1$–$C_{20}$ alkyl or alkenyl, a $C_3$–$C_{20}$ cycloalkyl or cycloalkenyl or a $C_6$–$C_{20}$ aryl or alkylaryl; $\{RA\}^{(-n)}$ is an acid anion or an acid derivative anion; n is the number of A groups in the anion; Q is P, S, N, As, or Sb; each R' is, independently, hydrogen or a substituted or unsubstituted $C_1$–$C_{20}$ alkyl, aryl, aralkyl, or alkenyl group, provided that when Q is N and the only fluoropolymer in the composition consists essentially of a terpolymer of TFE, a perfluorovinylether, and a perfluorovinylether cure site monomer comprising a nitrile group, not every R' is H; and k is one greater than the valence of Q; and, optionally, an additional curative material selected from the group consisting of: ammonium salts, ammonia-generating compounds, substituted triazine derivatives, unsubstituted triazine derivatives, bis-amidooximes, and organotin compounds; and optionally a coagent.

31. The method of claim 30 further comprising the step of incorporating an alcohol of the general formula $R^2$—OH, wherein $R^2$ is a $C_1$–$C_{20}$ alkyl group, and wherein $R^2$ is optionally partially fluorinated.

32. The method of claim 30 further comprising:
   c) shaping the composition;
   d) optionally curing the shaped composition; and
   e) optionally heat aging the cured composition.

33. The method of claim 32 wherein the step of curing comprises press-curing, and optionally post-curing.

34. A shaped article prepared according to the method of claim 30.

35. A composition comprising:
   (a) a perfluoropolymer comprising interpolymerized units derived from a nitrogen-containing cure site monomer;
   (b) a non-fluorinated catalyst composition selected from the group consisting of tributyl-(2-methoxy)-propyl phosphonium benzoate, tetrabutyl phosphonium carbonate, optionally
   (c) an alcohol of the general formula $R^2$—OH, wherein $R^2$ is an alkyl group having from 1 to 20 carbon atoms, and wherein $R^2$ is optionally partially fluorinated; and optionally
   (d) a filler selected from fluoropolymer filler, carbon black, and combinations thereof.

* * * * *

UNITED STATES PATENT AND TRADEMARK OFFICE
CERTIFICATE OF CORRECTION

PATENT NO. : 6,844,388 B2
DATED : January 18, 2005
INVENTOR(S) : Grootaert, Werner M. A.

It is certified that error appears in the above-identified patent and that said Letters Patent is hereby corrected as shown below:

Column 4,
Line 13, after "g is 0-5," insert -- h is 0-5, --

Column 6,
Line 12, "1" should be shown as -- I --

Column 9,
Line 43, "carbon-carbon" should be shown as -- carbon-to-carbon --

Column 10,
Line 45, "QR'$^k$" should be shown as -- QR'$_k$ --

Column 19,
Line 14, "COO$^{(+)})_q$" should be shown as -- COO$^{(-)})_q$ --
Line 16, "$^{(+)}$O$_x$-Ph-Gy-Ph-O$_z^{(-)}$" should be shown as -- $^{(-)}$O$_z$-Ph-Gy-Ph-O$_z^{(-)}$ --

Column 20,
Line 33, "(PR'$_4$)'OH$^-$," should be shown as -- (PR'$_4$)$^+$OH$^-$, --

Signed and Sealed this

Twenty-sixth Day of April, 2005

JON W. DUDAS
*Director of the United States Patent and Trademark Office*